United States Patent
Mundlapudi et al.

(10) Patent No.: US 9,336,288 B2
(45) Date of Patent: May 10, 2016

(54) WORKFLOW CONTROLLER COMPATIBILITY

(71) Applicant: Bank of America Corporation, Charlotte, NC (US)

(72) Inventors: Bharath Mundlapudi, San Ramon, CA (US); Karthik Banala, Charlotte, NC (US); Rajesh Koneru, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 238 days.

(21) Appl. No.: 13/908,681

(22) Filed: Jun. 3, 2013

(65) Prior Publication Data

US 2014/0358844 A1 Dec. 4, 2014

(51) Int. Cl.
*G06F 17/00* (2006.01)
*G06F 17/30* (2006.01)

(52) U.S. Cl.
CPC ................ *G06F 17/30563* (2013.01)

(58) Field of Classification Search
CPC .............. G06F 17/30592; G06F 17/30563; G06F 17/30569
USPC ........................................ 707/601, 602, 603
See application file for complete search history.

(56) References Cited

U.S. PATENT DOCUMENTS

| | | | |
|---|---|---|---|
| 6,044,374 A | 3/2000 | Nesamoney et al. | |
| 7,197,662 B2 | 3/2007 | Bullen et al. | |
| 7,543,177 B2 | 6/2009 | Bullen et al. | |
| 7,958,388 B2 | 6/2011 | Bullen et al. | |
| 8,782,101 B1 | 7/2014 | Moore | |
| 2005/0278152 A1* | 12/2005 | Blaszczak | 703/1 |
| 2009/0282089 A1 | 11/2009 | Lakshmanachar et al. | |
| 2012/0116980 A1* | 5/2012 | Mercuri | G06Q 10/103 705/301 |
| 2013/0073724 A1* | 3/2013 | Parashar et al. | 709/224 |
| 2013/0132368 A1 | 5/2013 | Wolfram | |
| 2013/0232157 A1 | 9/2013 | Kamel | |
| 2013/0246339 A1 | 9/2013 | Kendrena et al. | |
| 2014/0101092 A1* | 4/2014 | Simitsis | G06F 17/30398 707/602 |
| 2014/0156591 A1 | 6/2014 | Sukumar et al. | |
| 2014/0188784 A1 | 7/2014 | Guerra | |
| 2014/0245298 A1* | 8/2014 | Zhou et al. | 718/1 |

OTHER PUBLICATIONS

CA.com; CA Workload Automation AE—CA Technologies; www.ca.com/us/products/detail/CA-Workload-Automation-AE.aspx; last accessed Jun. 7, 2013.

(Continued)

*Primary Examiner* — Rehana Perveen
*Assistant Examiner* — Loc Tran
(74) *Attorney, Agent, or Firm* — Banner & Witcoff, Ltd.; Michael A. Springs (57) ABSTRACT

Aspects of the disclosure relate to workflow controller compatibility for in order to format workflow data such that communication between incompatible workflow controllers is facilitated. A compatibility processing module may execute one or more processes to format a workflow such that communication between previously incompatible workflow controllers is facilitated. A first workflow controller is configured with a compatibility processing module and receives a large number of data points. The compatibility module executes one or more processes on a workflow such that the processed workflow is compatible with a second workflow controller.

15 Claims, 5 Drawing Sheets

(56) References Cited

OTHER PUBLICATIONS

The Apache Software Foundation; Welcome to Apache Hadoop!; www.hadoop.apache.org; Jun. 5, 2013; last accessed Jun. 7, 2013.
The Apache Software Foundation; Welcome to Hive!; www.hive.apache.org; May 16, 2013; last accessed Jun. 7, 2013.
The Apache Software Foundation; Apache Oozie Workflow Scheduler for Hadoop; www.oozie.apache.org; Copyright 2011-2013.; last accessed Jun. 7, 2013.
Cloudera, Inc.; The Platform for Big Data and the Leading Solution for Apache Hadoop in the Enterprise—Cloudera; www.cloudera.com/content/cloudera/en/home.html; last accessed Jun. 7, 2013.
Teradata; Global Leader in Data Warehousing, Big Data Analytic Technoolgies & Dat Driven Marketing—Teradata; www.teradata.com; last accessed Jun. 7, 2013.
"Understanding Analytic Workloads." Edwards et al. IBM Netezza Strategic Marketing. Netezza Corporation. 2011. Retrieved from <http://www.ibmbigdatahub.com/sites/default/files/document/IBM-Netezza-Understanding-Analytic-Workloads-eBook.pdf> on Aug. 11, 2014.
"Programming Hive." Capriolo et al. O'Reilly Media, Inc. Oct. 2012. Retrieved from <http://cdn.oreillystatic.com/oreilly/booksamplers/9781449319335_sampler.pdf> on Aug. 11, 2014.

* cited by examiner

WORKFLOW CONTROLLER COMPATIBILITY

TECHNICAL FIELD

Aspects of the invention generally relate to systems and methods for facilitating compatibility between workflow controllers. In particular, various aspects of the systems and methods described herein include processes for establishing compatibility between an open-source workflow controller, and a workflow controller configured to execute proprietary processes.

BACKGROUND

Analytical methods may be used to extract meaningful trends and patterns from sets of data. Business Intelligence (BI) Analytics refers to analytical methods, as applied by business enterprises, to extract trends and patterns from large datasets. These trends and patterns may subsequently be used to inform future business decisions.

The datasets considered by BI analytical methods may consist of hundreds of thousands, or millions of data points. One example of a data set considered by these analytical methods may be a record of user clicks on a website, over a given time period. In this example, the use of BI analytics may extract trends from clicking patterns to establish, in one instance, when a given user is most likely to be receptive to advertisements placed on the website. Due to the sheer number of data points, a data stream processed by BI analytical methods may measure several terabytes to several petabytes or more, and due to the storage space requirements, such datasets are often referred to as "big data."

Conventional analytical methods and processes for analyzing and storing "big data" may be ineffective, due to the size of the datasets, and the associated memory requirements. Accordingly, several companies have specialized in building software, and supporting hardware, to receive, store, analyze, and schedule processing of large datasets. One such company is Computer Associates, Inc., which produces workflow controller software solutions, otherwise referred to as workflow automation tools, or workflow controllers. One such example of a workflow controller produced by Computer Associates, Inc. is Automation AE (AutoSys® Edition). A workflow controller is one or more processes, and associated hardware, for scheduling, tracking, and reporting, among others, on computational tasks, or computational processes executed by one or more computer systems that are in communication with the workflow controller. In one implementation, a workflow controller may schedule computational tasks to be carried out by one or more distributed computer systems, or one or more extract, transform, and load (ETL) processes to be carried out by an ETL processing module, and the like.

Commercially available solutions may be referred to as proprietary solutions. Open-source software solutions may be available from, e.g., The Apache Software Foundation. Open-source software solutions may be associated with a plurality of open-source software and supporting hardware solutions. Proprietary solutions and open-source solutions may each offer their own unique advantages.

Apache Hadoop® is an example of an open-source solution framework that facilitates the use of distributed hardware for parallel processing of large datasets. Apache Hive is an example of an open-source data warehouse that expands upon the Hadoop® framework. Apache Oozie is an example of an open-source workflow controller that also expands upon the Hadoop framework. Open-source solutions may include unique functionality relative to proprietary solutions. This functionality may include, for example, large scalability and expansion to include increased computational resources, such that the solution may be scaled for use with large collections of computer server clusters. Open-source solutions may also offer various cost savings to enterprises due to their ability to run processes on non-specialized, commodity hardware. Furthermore, open-source solutions may be implemented and utilized using a variety of programming languages. It will be appreciated, however, that proprietary solutions may similarly offer some or all of these advantages as well. Accordingly, an enterprise may choose to implement both open-source and proprietary solutions to analyze big data.

A data warehouse, also referred to as an enterprise data warehouse, is a repository of data, whereby a stream of raw, unprocessed data, or previously-process data, is received by a data warehouse, and processed by, in one implementation, ETL processes, before being stored. Although open-source and proprietary solutions each offer various advantages, individual solutions may implement one or more unique formats, protocols, and the like. As a result, open-source solutions may not be compatible with proprietary solutions and vice versa. As an example, a compatibility issue may arise if an enterprise desires to communicate open-source workflows to a proprietary workflow controller, or if an open-source workflow controller is to receive proprietary workflows from a proprietary workflow controller.

Therefore, a need exists to establish compatibility between an open-source workflow controllers and proprietary workflow controllers in order to utilize the unique advantages of each.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of this disclosure relate to a workflow controller compatibility system, for executing processes to format workflow data such that communication between incompatible workflow controllers is facilitated. In particular, this disclosure includes details of a distribution processing module. A distribution processing module may receive one or more streams of data, wherein the one or more streams of data contain a large number of data points, and wherein the total number of data points may be multiple millions or more. The distribution processing module communicates part of the received one or more data streams to a parallel processing module such that the parallel processing module processes the received one or more data streams using one or more distributed computer systems. In one implementation, the parallel processing module may execute map and reduce processes, wherein the map and reduce processes are made up of mapping tasks, which distribute the processes across one or more distributed computational systems, and reducing tasks, which aggregate, or combine, the one or more results of the one or more mapping tasks. Further, a first workflow controller schedules the map and reduce processes to be executed according to a workflow having a first data format. The first workflow controller is in communication with a compatibility processing module, such that the compatibility processing module is configured to execute processes to re-format the workflow, into a second data format that is compatible with a second workflow controller In another aspect, this disclosure relates to non-transitory computer-readable storage media, having computer-executable instructions for establishing compatibility between workflow controllers. The instructions may be executed by a processor, and include receiving a data stream by a distribution processing module, and executing a map and reduce process on a data point from the data stream using a parallel processing module. The instructions further include scheduling the map and reduce processes in a workflow with a first data format, by a first workflow controller, and re-formatting, using a compatibility processing module, the workflow with a second data format such that the workflow is compatible with a second workflow controller.

In yet another aspect, this disclosure includes a method for establishing compatibility between workflow controllers. The method includes receiving a data stream by a distribution processing module, and executing one or more process on a data point from the data stream. The processes are executed according to a workflow, wherein the workflow is received in a first data format from a first workflow controller, and re-formatted into a second data format by a compatibility processing module such that the workflow is compatible with a second workflow controller.

Aspects of this disclosure address one or more of the issues mentioned above by disclosing methods, non-transitory computer readable media, and apparatuses for establishing compatibility between an open-source data warehouse and a proprietary data warehouse. Aspects of the disclosure may be provided in a non-transitory computer-readable medium having computer-executable instructions to perform one or more of the process steps described herein.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The present invention is illustrated by way of example and is not limited in the accompanying figures in which like reference numerals indicate similar elements.

DETAILED DESCRIPTION

As discussed above, there is a need to establish compatibility between workflow controllers, such as between open-source workflow controllers and proprietary workflow controllers In accordance with various aspects of this disclosure, systems, methods, non-transitory computer-readable media, and apparatuses are disclosed in which a data stream is received into an open-source environment by an open-source distribution processing module. A parallel processing module may execute one or more map and reduce processes on a data point received in the data stream, wherein the one or more map and reduce processes facilitate distributed processing of the data stream across one or more general-purpose, or specialized, computer systems, among others. In this way, one or more map and reduce processes includes mapping, or dividing computational tasks across computer systems, for execution in a distributed manner. Subsequently, one or more reducing processes are executed by the parallel processing module to aggregate, or combine, the results of the processes carried out across the distributed computer systems. The one or more map and reduce processes executed by the parallel processing module may, in one implementation, be scheduled by an open-source workflow controller, wherein an open-source workflow controller may generally be used in an open-source environment for scheduling computational tasks from a variety of processors. In this way, an open-source workflow controller may execute one or more processes for ordering the one or more computational tasks associated with a map and reduce process, such that a second map and reduce process is not executed before completion of a first map reduce process, and the like. However, in one implementation, one or more processes, or formatting conventions, associated with an open-source workflow controller may not compatible with a proprietary workflow controller. Advantageously, the systems and methods described herein include a compatibility processing module, for establishing compatibility between an open-source workflow controller and a proprietary workflow controller. In this way, a compatibility processing module may execute one or more processes for reconfiguring, or reformatting a proprietary workflow such that it is compatible with an open-source workflow controller, or reformatting an open-source workflow such that it is compatible with a proprietary workflow controller, and the like. Furthermore, a compatibility processing module facilitates communication between an open-source environment and subsequent downstream systems that adhere to formatting and/or processing standards or conventions used by a proprietary workflow controller. It will be recognizes, however, that the principles described herein may be applied to established compatibility between two or more open-source workflow controllers, two or more proprietary workflow controllers, or combinations of such.

In the context of this disclosure, an open-source environment refers to a single, or multiple computer systems, computer devices, or computer software applications, wherein an open-source environment may comprise, among others, an open-source workflow controller, for scheduling one or more computational processes to be executed on a received one or more data points from a data stream. A data point may be considered a discrete piece of information that may be a part of one or more data streams, or one or more groups of data, wherein a data stream, or a group of data may be made up of multiple data points. In this way, a data point may be any piece of information that may be stored in a digital medium, and may include, among others, numerical values, indexes, text, or symbols, among others. For example, a data point may be an RGB value that represents a color of light captured by a light sensor, or a data point may be a numerical value corresponding to a total number of customers received at a store over a predetermined time period. Furthermore, a data point may be composed of one or more values. For example, the lap times of a racecar may be stored as a single data point, such that the data point may include, among others, a name of the racecar team, a number of the racecar, a first lap time value, a second lap time value, and the like.

An open-source workflow controller may include a compatibility processing module, for establishing compatibility between an open-source workflow controller and a proprietary workflow controller. In this way, a compatibility processing module, and other processors in an open-source environment, may be considered as stand-alone computer systems, computer devices, or computer software applications, implemented at distributed computers across a network, such as the Internet, a wide area network, a local area network, or a storage area network, or any other type of communication network. In another implementation, separate computer systems may be implemented as separate cores of a processor on a common integrated circuit. However, in yet another implementation, a compatibility processing module may share hardware, and supporting software resources, with one or more other processors and processes. In the description that follows in relation to FIG. 1, a general computer system is described, which may be implemented as, in one embodiment, a compatibility processing module, among others.

Figure 1:
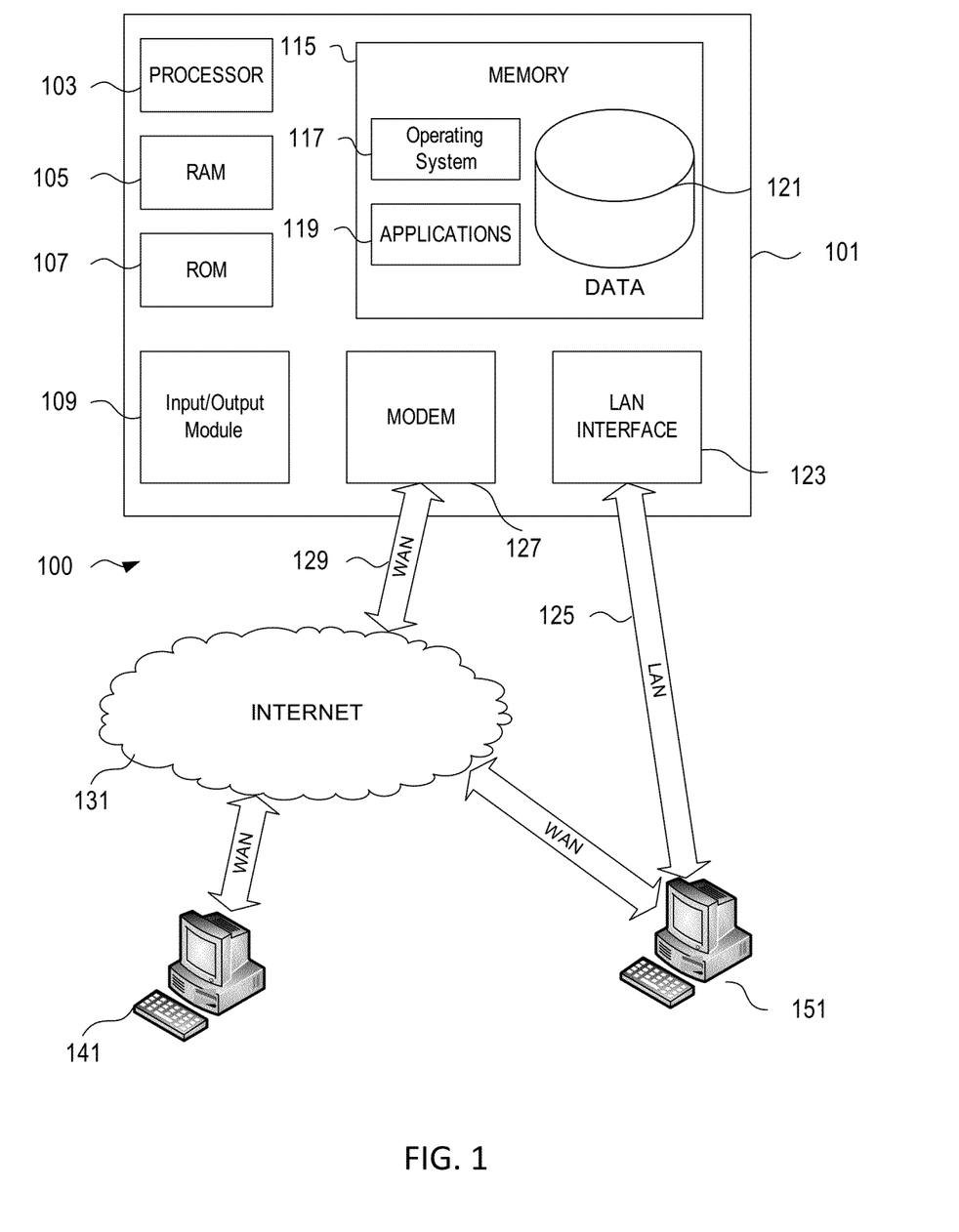
FIG. 1 shows an illustrative operating environment in which various aspects of the disclosure may be implemented.

FIG. 1 illustrates a block diagram of an example of an implementation of a computing environment 100. The computing environment 100 includes a compatibility processing module 101, which is shown, in this example, as a computing device 101. Further, the computing environment 100 may be an open-source environment, such as that of an open-source environment. The computing device 101 may have a processor 103 for controlling overall operation of the compatibility processing module 101 and its associated components, including RAM 105, ROM 107, an input/output (I/O) module 109, and memory 115.

I/O module 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to the processor 103 for enabling the computing device 101 to perform various functions. For example, memory 115 may store software used by the computing device 101, such as an operating system 117, application programs 119, and an associated database 121. The processor 103 and its associated components may allow the computing device 101 to run a series of computer-readable instructions to process and format data such that data processed by computing environment 100 is understood by, and compatible with, another workflow controller, which may be a proprietary workflow controller.

The computing device 101 may operate in a networked environment supporting connections to one or more remote computers, such as terminals 141 and 151. The terminals 141 and 151 may be personal computers or servers that include many or all of the elements described above relative to the computing device 101. Alternatively, terminal 141 and/or 151 may be a data store that is affected by the operation of the computing device 101. The network connections depicted in FIG. 1 include a local area network (LAN) 125 and a wide area network (WAN) 129, but may also include other networks. When used in a LAN networking environment, the computing device 101 is connected to the LAN 125 through a network interface or adapter 123. When used in a WAN networking environment, the computing device 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Additionally, an application program 119 used by the computing device 101 according to an illustrative embodiment of the disclosure, may include computer-executable instructions for invoking functionality related to establishing compatibility of the data processed in an open-source workflow scheduler such that it is compatible with, and may be further processed by, a proprietary workflow scheduler with different standards and conventions for formatting of data, and the operations that may be executed on data.

The computing device 101 and/or terminals 141 or 151 may also be mobile terminals, such as smart phones, personal digital assistants (PDAs), and the like, which may include various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, and the like that perform particular tasks or implement particular abstract data types. The disclosure may also be practiced in distributed computing environments where tasks are performed by remote processing devices that are linked, for example, through a communications network. In a distributed computing environment, program modules may be located in both local and remote computer storage media including memory storage devices.

Figure 2:
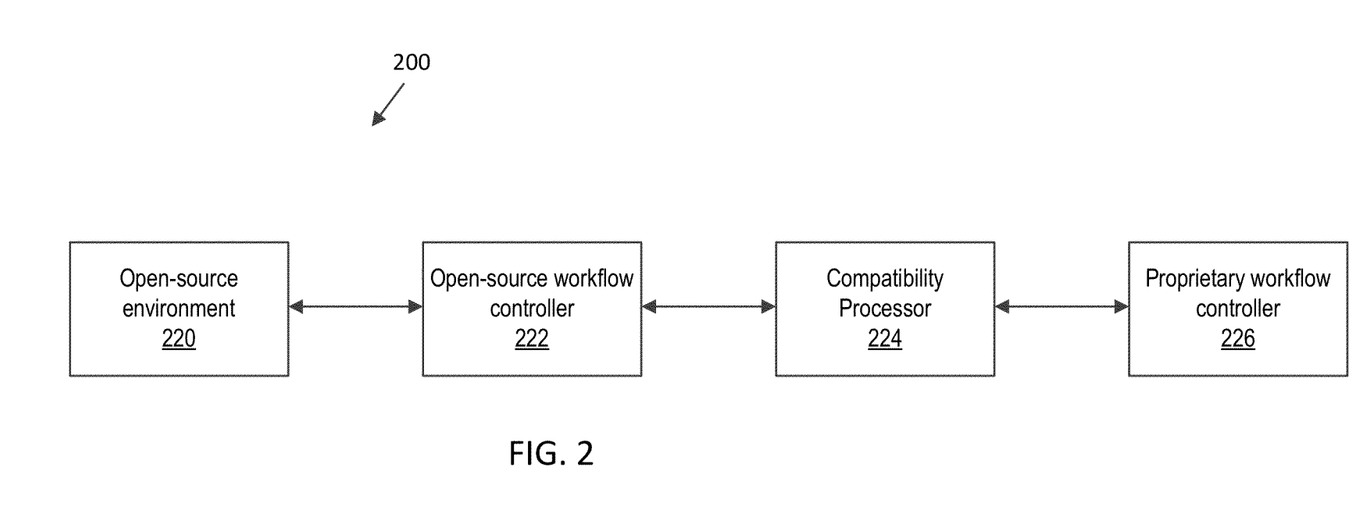
FIG. 2 is a schematic block diagram of an example of an implementation of workflow controller compatibility system.

FIG. 2 is a schematic block diagram of an example of an implementation of workflow controller compatibility system 200. In particular workflow controller compatibility system 200 includes an open source environment 220, an open-source workflow controller 222, a compatibility processing module 224 and a proprietary workflow controller 226. Open-source environment 220, in one implementation, may be used to execute distributed processes, or computational tasks, across one or more distributed computer systems, wherein open-source environment 220 may be in communication with an open-source workflow controller 222, for scheduling one or more computational tasks for execution. In another implementation open-source environment 220 may be used to execute one or more processes on shared hardware, and such that the computational processes are not distributed. In yet another implementation, open-source environment 220 may execute one or more computational processes using a combination of distributed and shared computational system hardware.

In one embodiment, it may be desirable for open-source environment 220 communicate with proprietary workflow controller 226, such that proprietary workflows may be executed using open-source environment 220. Previously, one or more proprietary processes and/or formatting conventions may not have been compatible between proprietary workflow controller 226 and open-source workflow controller 222. Advantageously, compatibility processing module 224 facilitates communication of workload information between proprietary workflow controller 226 and open-source workflow controller 222, such that open-source workflows are compatible with proprietary workflow controller 226, and proprietary workflows are compatible with open-source workflow scheduler 222, and the like.

Figure 4:
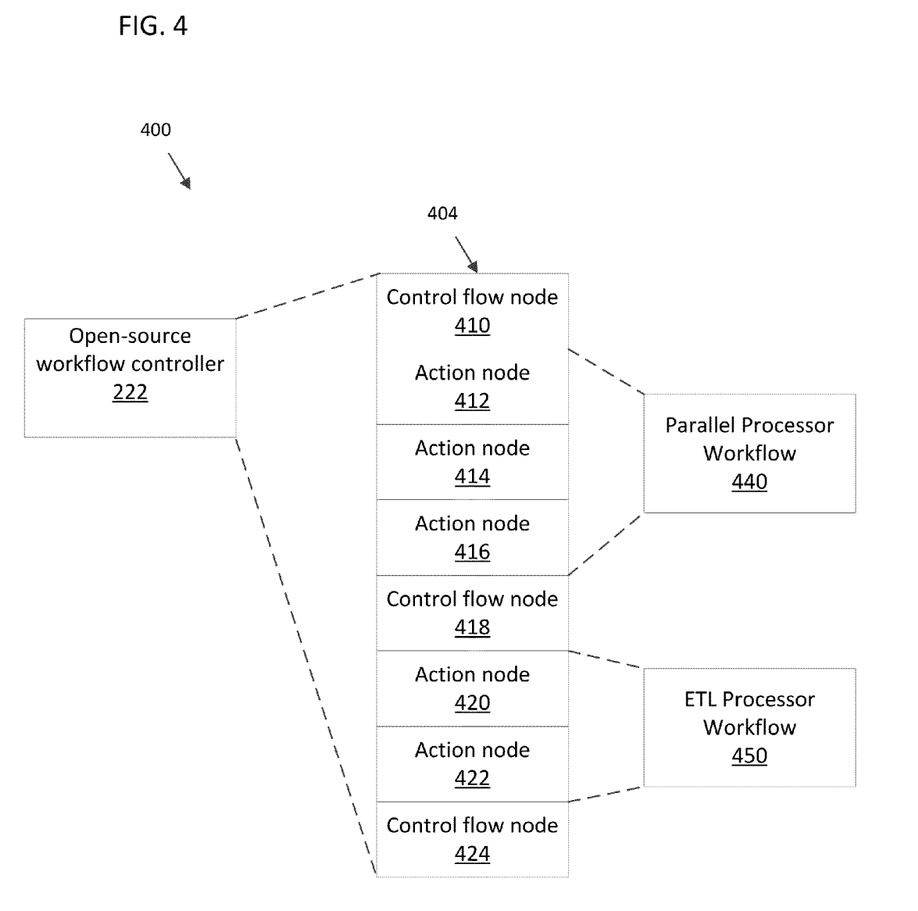
FIG. 4 schematically depicts an open-source workflow controller scheduler process.

In one implementation, an enterprise may implement an open-source environment 220 to execute, among others, data warehousing, and business intelligence analytics. The enterprise may also implement a proprietary environment in conjunction with the open-source environment. An open-source workflow controller 222 may be configured to build workflows of computational tasks to be carried out by one or more open-source systems and methods. Specifically, an open-source workflow controller may be configured to build one or more workflows, wherein a workflow is made up of a collection of one or more action nodes, and one or more control flow notes. An action node contains one or more executable instructions to be carried out by an open-source system or method, and wherein one or more action nodes may be grouped together and represent a workflow. Control flow nodes define the beginning and the end of a workflow, and may execute decision points such that a particular workflow may be executed based on the result of a previous workflow. FIG. 4 is a schematic block diagram including a more detailed description of open-source workflows.

Figure 3:
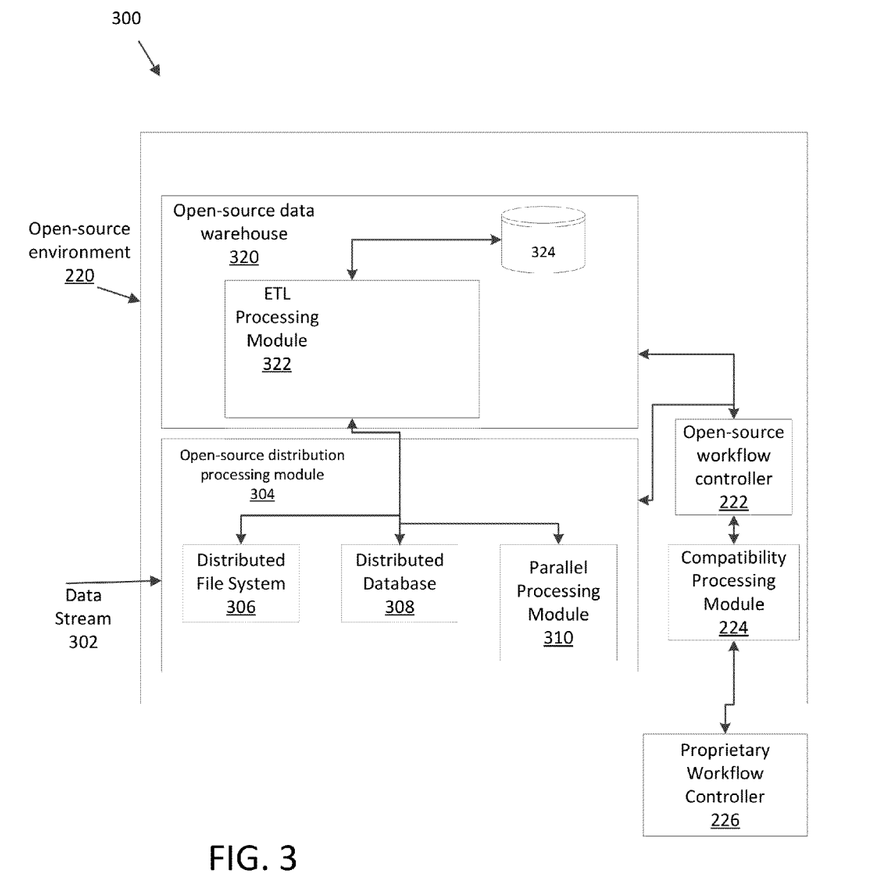
FIG. 3 is a schematic block diagram of a more detailed view of the workflow controller compatibility system from FIG. 2.

In yet another implementation, proprietary workflow control system 226 may be used by one or more systems and methods, or entities, which may communicate with a business enterprise using open-source environment 220. FIG. 3 is a schematic block diagram of a more detailed view of the example workflow controller compatibility system of FIG. 2. In particular, the workflow controller compatibility system 300 includes an open-source environment 220, a data stream 302, an open-source distribution processing module 304, a distributed file system 306, a distributed database 308, a parallel processing module 310, open-source data warehouse 320, ETL processing module 322, a storage device 324, open-source workflow controller 222, compatibility processing module 224, and proprietary workflow controller 226.

Open-source environment 220 may refer to hardware, and supporting software, for executing processes associated with an open-source data warehouse 320 or an open-source workflow controller 222. Specifically, the open-source distribution processing module 304 may be implemented such that open-source distribution processing module 304 executes one or more processes to facilitate distributed storage and processing of data stream 302 across one or more computer systems or servers.

Data stream 302, may be received by the open-source distribution processing module 304. Open-source distribution processing module 304 may, in one implementation, communicate part, or all, of data stream 302 to distributed file system 306. Distributed file system 306 may be an open-source Distributed File System (DFS), wherein the DFS 306 may store all, or part, of data stream 302 across one or more storage devices. The DFS 306 may be a Java-based system that typically has one or more metadata servers, referred to as namenodes, which store information related to the storage location of data, and a cluster of datanodes, which serve up memory blocks used to store the data. The one or more namenodes and the cluster of datanodes may be distributed such that a single namenode or datanode is implemented on a dedicated storage device. In another implementation, multiple namenodes and/or datanodes may be present on a common storage device, but the DFS may replicate data storage across multiple different storage devices to achieve redundancy. In one implementation, the DFS may store the data stream 302 in non-volatile, or persistent memory, such as hard disk drives (HDDs), solid state drives (SSDs), optical disk (CDs, DVDs, and the like), tape, read only memory (ROM) chips, or any other non-volatile storage medium. In another implementation, HDFS 306 may store part, or all, of data stream 302 in volatile memory, such as random access memory (RAM), that is cleared by a power cycle or other reboot operation.

Open-source distribution processing module 304 may, in one embodiment, use a distributed database 308. Distributed database 308 may be an open-source distributed database. Distributed database 308 may expand upon the functionality of DFS 306, and may execute processes to, among others, access small amounts of data from a large dataset stored in DFS 306. Distributed database 308 is configured to search and access smaller pieces of data from larger datasets with lower latency than can be achieved using DFS 306 alone.

Open-source distribution processing module 304 may have a parallel processing module 310, configured to execute map and reduce processes on data stored in distributed file system 306 or distributed database 308. Map and reduce processes allow large data sets to be manipulated using parallel processing. In practice, map and reduce processes may be implemented by a plurality of distributed computers, or nodes, such that one or more mapping steps divide a computational process to be executed into a plurality of smaller computational processes, and distribute these smaller computational problems for processing by the plurality of distributed nodes. Subsequently, one or more reducing steps receive the returned results from the processes executed by the plurality of nodes, and combine the results, producing parallel-processed data as an output.

Data stored in the distributed file system 306, the distributed database 308, or manipulated by parallel processing module 310 may be communicated to open-source data warehouse 320. Open-source data warehouse 320 facilitates extract, transform, and load (ETL) processes using ETL processing module 322. Using ETL processing module 322, the data stream 302, part, or all, of which may be stored in distributed file system 306 and distributed database 308, is further processed and stored such that patterns and trends can be found from data stream 302, or such that data will be formatted for analysis by other analytical tools. The result of ETL processes executed by ETL processing module 322 may be one or more refined, or parsed, datasets that may exclude data points that do not conform to a predetermined pattern or structure.

Open-source data warehouse 320 includes storage 324, for storing the refined, or parsed data from the ETL processing module 322, wherein storage 324 may be one or more storage devices consolidated in a single server rack, or distributed across a LAN, WAN, the Internet, or any other communication network. The storage devices may be non-volatile storage devices, such as HDDs, SSDs, optical disks, storage tapes, ROM, and the like. In another implementation, the one or more storage devices represented by storage 324 may be volatile storage, such as RAM, and the like.

In another implementation, open-source environment 302 has a workflow controller 222, for managing the sequence in which a plurality of computational processes are executed by, in one embodiment, parallel processing module 310, and ETL processing module 322, or any other open-source system or method, among others. Workflow controller 222 may be embodied as an open-source workflow scheduler, or workflow controller, configured to manage the sequence in which the processes are executed.

Open-source workflow controller 330 may be configured with a control dependency direct acyclic graph, which is a list of actions that are to be performed in a given order, such that a second action in the control dependency direct acyclic graph is not executed until a first action has been executed, and so on. A direct acyclic graph may be embodied as an open-source workflow comprising control flow nodes, and action nodes. Control flow nodes are groups of one or more executable instructions including, among others, a delineation of a start or an end of a workflow, or computational task. Control flow nodes may also be configured to execute decision processes such that data is processed according to a selected process, wherein the selected process is chosen from a plurality of possible processes, and the selection is made based on one or more attributes of the data. Action nodes are groups of one or more executable instructions that may be communicated to the open-source workflow controller by, in one embodiment, parallel processing module 310. In this way, one or more action nodes may group together a plurality of map and reduce processes to be executed on data stream 302.

Proprietary workflow controller 226 may, in one implementation, be an automated job control system, or workflow controller, used for defining, scheduling, monitoring, and reporting on computational jobs. A computational job may otherwise be referred to as: a process, or a task, among others. In one implementation the proprietary workflow controller may be configured to execute one or more different job types, including: command jobs, wherein command jobs execute one or more processes associated with one or more proprietary systems and methods, box jobs, wherein box jobs are collections of one or more other job types, and file watcher jobs, wherein file watcher jobs execute one or more processes upon receipt of a specific file type.

Previously, an open-source environment 220 and a proprietary workflow controller 226, may have been incompatible due to the unique formatting conventions, protocols, and processes respectively implemented by each type of solution. Advantageously, compatibility processing module 224 is configured to establish compatibility between open-source environment 220, specifically open-source workflow controller 222, and proprietary workflow controller 226. In one implementation, compatibility processing module 224 is configured to implement one or more processes for translating, reconfiguring, or formatting a workflow received from proprietary workflow controller 226 such that the computational tasks received in the proprietary workflow can be understood by open-source workflow controller 222, and subsequently executed by one or more systems and methods of open-source environment to 220 (and vice versa). Additionally, compatibility processing module 224 may execute one or more processes to communicate one or more workflow statuses from open-source environment 220 to proprietary workflow controller 226, wherein a workflow status includes one or more of a running status, a queued status, an on-hold status, a succeeded status, a failed status, or a killed status. In this way, one or more workflow statuses may be generated by one or more systems and methods within open-source environment 220 in response to a request from proprietary workflow controller 226, or open-source workflow controller 222, among others, and returned as a value representative of a current status of the computational process scheduled by open-source workflow controller 222 or proprietary workflow controller 226. In yet another implementation, compatibility processing module 224 may communicate one or more workflow statuses from open-source environment 220 to proprietary workflow controller 226 directly, and before open-source workflow controller 222 receives the one or more workflow statuses.

FIG. 4 schematically depicts an open-source workflow controller scheduler process 400. In particular FIG. 4 depicts open-source workflow controller 222, and an example workflow schedule 404, wherein workflow schedule 404 that is made up of control flow node 410, action node 412, action node 414, action node 416, control flow node 418, action node 420, action node 422, control flow node 424. FIG. 4 further depicts parallel processing module workflow 440, and ETL processing module workflow 450.

In one implementation, parallel processing module 310, from FIG. 3, may communicate to open-source workflow controller 222, one or more executable instructions to be processed using data points from data stream 302. In response, open-source workflow controller 222 may build one or more workflows from the one or more executable instructions received. In the exemplary embodiment of FIG. 4, open-source workflow controller 222 configures the received executable instructions to be processed as parallel processing module workflow 440. Similarly, one or more executable instructions to be processed on data stream 302, and received from ETL processing module 322, may be configured, by open-source workflow controller 222, as ETL processing module workflow 450.

Workflow schedule 404 represents the sequence of computational processes, or tasks, to be carried out at the open-source environment 220, wherein workflow schedule 404 may be configured to be part of a control dependency direct acyclic graph, such that the list of actions or computational tasks contained in workflow schedule 404 are performed in a given order. In this way, open-source workflow controller 222 schedules processes to be executed such that a second process may not be executed until the execution of a first process has been completed. Parallel processing module workflow 440, in this example workflow schedule 404, is embodied as action node 412, action node 414, and action node 416, wherein action nodes 412, 414, and 416 contain one or more processes to be executed by parallel processing module 310 in a specific order. In one embodiment, the processes associated with action node 412 are executed before those associated with action node 414, and subsequently, those associated with action node 416, and the like. Control flow node 410 represents the start of parallel processing module workflow 440. Additionally, control flow node 418 delineates the end of parallel processing module workflow 440, and the start of ETL processing module workflow 450. Similarly control flow node 424 delineates the end of ETL process workflow for 450. It will be readily apparent to those of skill in the art that workflow schedule 404 is merely representative of one example workflow schedule, configured by open-source workflow controller 220, and other workflow schedules may contain, in one embodiment, more, and in another embodiment, fewer control flow nodes and action nodes than control flow workflow schedule 404.

Figure 5:
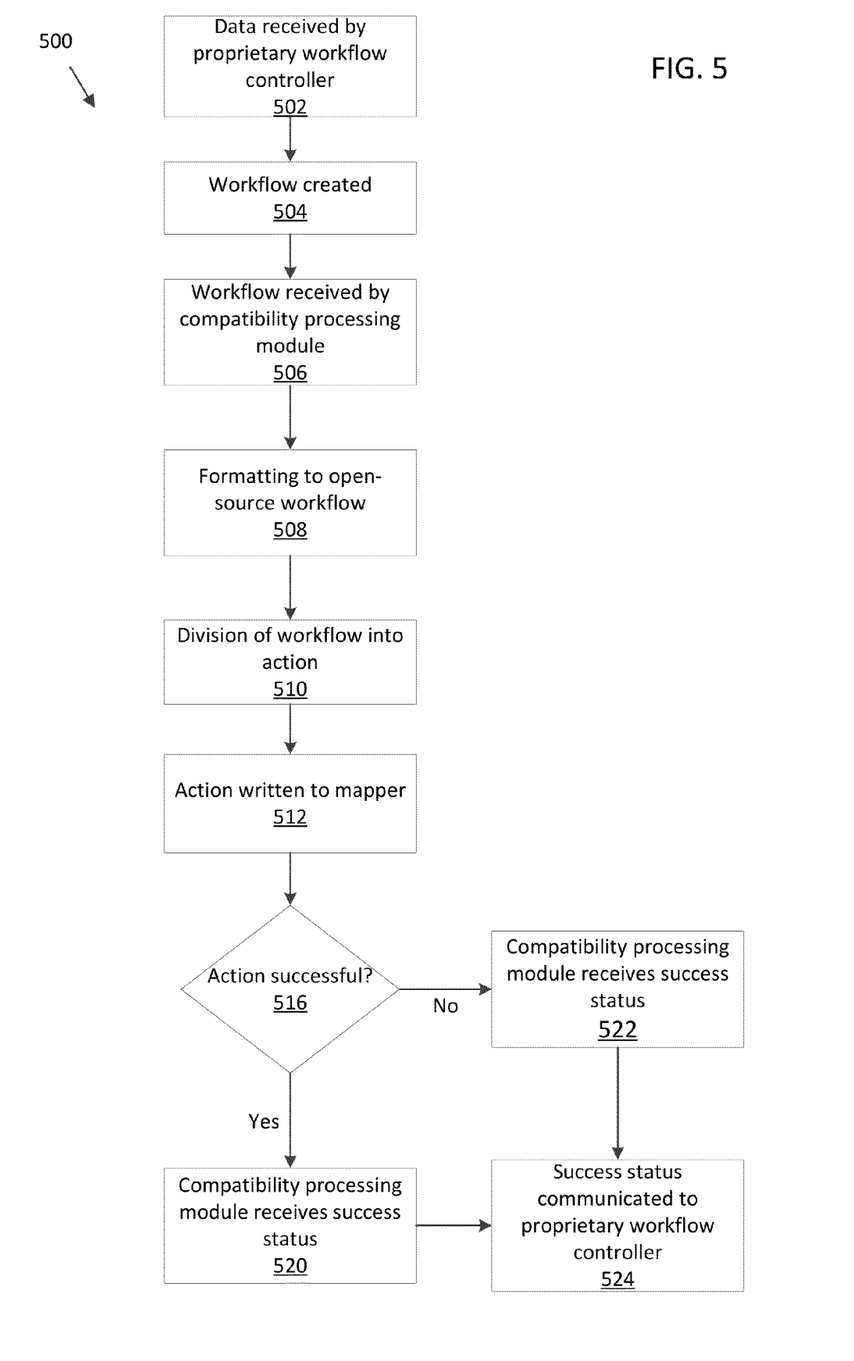
FIG. 5 is a flowchart diagram of an example process for establishing compatibility between an open-source workflow controller and a proprietary workflow controller.

FIG. 5 is a flowchart diagram of a process 500 for establishing compatibility between an open source workflow controller 222, and a proprietary workflow controller 226, wherein a compatibility processing module 224 is configured to execute one or more processes to translate, or format one or more workflows associated with a proprietary workflow controller 226 such that it may be understood by, and compatible with, an open source workflow controller 222, or vice versa.

In particular, process 500 begins at step 502, wherein a proprietary workflow controller receives one or more computational tasks to be scheduled. In one implementation, the received computational tasks to be scheduled may be computational tasks associated with a proprietary data warehouse. In one embodiment, the proprietary workflow controller may be in communication with an open source environment, such as open-source environment 220 from FIG. 3. However, proprietary workflow controller may be incompatible with an open-source environment 220, such that one or more formatting conventions or processes executed by proprietary workflow controller may be unreadable by an open-source workflow controller 222.

Block 504 represents the creation, by proprietary workflow controller 226, of a proprietary workflow, wherein the proprietary workflow is incompatible with an open-source environment 220. The proprietary workflow may be received by a compatibility processing module 224 at block 506 of process 500, wherein in response to receipt of the proprietary workflow, the compatibility processing module may execute one or more processes to transform, or re-format, the proprietary workflow such that it may be understood by, or compatible with, the open-source environment 220. Compatibility processing module 224 may, in one implementation re-format a proprietary workflow by converting one or more parameters associated with a proprietary workflow into one or more workflow parameters compatible with one or more formatting conventions of an open-source workflow, or vice versa. In this way, compatibility processing module 224 may re-format a workflow from a first format into a second format, wherein the first format and the second format may be compatible with, among others a proprietary workflow and a proprietary workflow controller 226, or an open-source workflow and open-source workflow controller 222, or combinations thereof.

These workflow parameters may include an input directory, wherein an input directory may specify, among others, one or more of the location, or an identifier associated with, of one or more data points, or a data stream to be processed by a workflow. An identifier may be, among others, a memory block address, a disk block address, a file location in a file system, a name associated with the one or more data points, or a number that identifies one or more data points, or combinations thereof. Additionally, the workflow parameters may include an output directory, wherein an output directory is a storage location of one or more processed data points. Further, the workflow parameters include a job tracker location, wherein the job tracker location may be, among others, the location of one or more processors for executing processes to monitor the status of the workflow. In one embodiment, the job tracker location is a location of an open-source workflow controller 222, or proprietary workflow controller 226, among others, and wherein the location may be specified by one or more of, an IP address, or a MAC address, a URL, an email address, or combinations thereof, among others.

The workflow parameters may also include the location of a namenode, wherein a namenode is a metadata server that stores information related to the storage location of data. The workflow parameters may further include a specification of one or more mappers and reducers to be used in processing data associated with the workflow, wherein the one or more mappers and reducers may be associated with a parallel processing module, such as parallel processing module 310, among others. Additionally, the workflow parameters may include one or more arguments, or values, specific to the workflow.

Compatibility processing module 224 may store one or more conversion values corresponding to the one or more workflow parameters of a received workflow from, in one implementation an open-source workflow controller 222, or, in another implementation, a proprietary workflow controller 226. In this way, compatibility processing module 224 may execute one or more processes using stored conversion values to make compatible, a workflow from open-source workflow controller 222 with proprietary workflow controller 226, or vice versa.

Block 508 represents, in one implementation an output, from compatibility processing module 224, of an open-source workflow, wherein compatibility processing module 224 may have reformatted one or more workflow parameters associated with the proprietary workflow of block 504.

Block 510 of process 500 represents the division of an open-source workflow into one or more computational jobs, or actions, to be executed by one or more systems and methods within open-source environment 220. Furthermore, an action may be executed in a specific order associated with an open-source workflow. In one example embodiment, the open-source workflow may be associated with a parallel processing module 310, for executing one or more map and reduce processes.

Subsequently, one or more actions are written to one or more mappers, wherein a mapper is one or more processes, executed by parallel processing module 310, for distributing the one or more actions among one or more distributed computer systems.

Block 516 represents a decision point associated with a polling process, executed by proprietary workflow controller 226, to determine whether the one or more actions associated with block 510 completed successfully. Consequently, block 516 also represents a decision point at which it is determined whether the open-source workflow, and proprietary workflow, were successful. In one implementation, an action may report that the one or more associated processes failed to execute to completion. In this instance, process 500 continues from block 516 to block 520, wherein at block 520, compatibility processing module 224 receives the failed status, reconfigures the status for compatibility with proprietary workflow controller 226, and communicates this failed status directly to proprietary workflow controller at block 524. In another implementation, block 516 may return a succeeded status as a return status output from an action, wherein in response to a succeeded status, process 500 continues from block 516 to block 522, and compatibility processing module receives the success status, reconfigures the status for compatibility with proprietary workflow controller 226, and communicates it directly to proprietary workflow controller at block 524.

In view of the foregoing, it will be appreciated that process 500 is only an example process, and that additional or alternative processes may be employed to achieve compatibility by compatibility processing module 224.

The present disclosures further provide technical advantages. As noted above, a compatibility processing module 224 facilitates compatibility of workflows processed by an open-source workflow controller or a proprietary workflow controller. In this way, compatibility processing module 224 by executing one or more compatibility processes, facilitates operation of an open-source environments to 20 within a business enterprise environment, while retaining compatibility with systems and methods configured to accept data formatted according to conventions utilized by proprietary solutions. Additionally, open-source solutions may achieve further cost savings for users, due to their ability to run processes on non-specialized, commodity hardware. Furthermore, open-source solutions may be implemented and utilized using a variety of programming languages.

Some embodiments of the above described may be conveniently implemented using a conventional general purpose or a specialized digital computer or microprocessor programmed according to the teachings herein, as will be apparent to those skilled in the computer art. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information and signals may be represented using any of a variety of different technologies and techniques. For example, data, instructions, requests, information, signals, bits, symbols, and chips that may be referenced throughout the above description may be represented by voltages, currents, electromagnetic waves, magnetic fields or particles, optical fields or particles, or any combination thereof.

Some embodiments include a computer program product comprising a computer readable medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a storage medium having instructions stored thereon/in which may be used to control, or cause, a computer to perform any of the processes of an embodiment. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in. Additionally, the storage medium may be a hybrid system that stored data across different types of media, such as flash media and disc media. Optionally, the different media may be organized into a hybrid storage aggregate. In some embodiments different media types may be prioritized over other media types, such as the flash media may be prioritized to store data or supply data ahead of hard disk storage media or different workloads may be supported by different media types, optionally based on characteristics of the respective workloads. Additionally, the system may be organized into modules and supported on blades configured to carry out the storage operations described herein.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Accordingly, it will be understood that the invention is not to be limited to the embodiments disclosed herein, but is to be understood from the following claims, which are to be interpreted as broadly as allowed under the law.

Those of skill would further appreciate that the various illustrative logical blocks, modules, circuits, techniques, or method steps of embodiments described herein may be implemented as electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, any software module, software layer, or thread described herein may comprise an engine comprising firmware or software and hardware configured to perform embodiments described herein. In general, functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

What is claimed is:

1. A system for establishing compatibility between workflow controllers comprising:
   a computing memory;
   a first computing device configured to receive a data stream comprising a plurality of data points, the first computing device being configured to distribute individual data points of the data stream to one of a plurality of second computing devices, each second computing device being configured to process the data point received and generate a processed data point;
   a data store storing a first workflow having a first data format, the first workflow comprising a plurality of action nodes, each action node comprising an instruction to be executed wherein the instruction of at least one of the action nodes comprises a map and reduce process on a set of data points of the data stream;

a first workflow controller which schedules execution of the action nodes of the first workflow;

wherein the first workflow controller is further executed one or more formatting processes on the first workflow in order to obtain a second workflow having a second data format that is compatible with a second workflow controller which schedules execution of the second workflow; and wherein at least one of the formatting processes is configured to format a first workflow parameter of a plurality of first workflow parameters of the first workflow according to the second data format to obtain a second workflow parameter for the second workflow, the plurality of workflow parameters comprising (i) a mapper to utilize during the map and reduce process, (ii) a reducer to utilize during the map and reduce process, (iii) an input location at which the plurality of data points are stored, (iv) an output location at which to store the processed data point, and (v) a location at which a job tracker which monitors a status of the first workflow resides.

2. The system according to claim 1, wherein:
the first computing device is further configured to communicate a workflow status to the second workflow controller; and
the workflow status comprises at least one of a succeeded status, a failed status, or a killed status.

3. The system according to claim 2, wherein the first computing device communicates the workflow status to the second workflow controller before communicating the status to the first workflow controller.

4. The system according to claim 1, further comprising a distributed file system, wherein the first computing device configures the first workflow from the first workflow controller to execute one or more distributed file system processes.

5. The system according to claim 1, further comprising a data warehouse, wherein the first computing device configures the first workflow from the first workflow controller to execute one or more data warehouse processes.

6. A non-transitory computer-readable storage medium having computer executable program instructions stored thereon that when executed by a processor cause the processor to perform steps establishing compatibility between workflow controllers, the steps comprising:
receiving, a data stream comprising a plurality of data points;
distributing individual data points of the data stream to one of a plurality of second computing devices, each second computing device being configured to process the data point received and generate a processed data point;
storing a first workflow having a first data format, the first workflow comprising a plurality of action nodes, each action node comprising an instruction to be executed wherein the instruction of at least one of the action nodes comprises a map and reduce process on a data point from the data stream;
scheduling, using a first workflow controller, execution of the action nodes of the first workflow; and
executing one or more formatting processes on the first workflow workflow in order to obtain a second workflow having a second data format that is compatible with a second workflow controller which schedules execution of the second workflow;
wherein at least one of the formatting processes is configured to format a first workflow parameter of a plurality of first workflow parameters of the first workflow according to the second data format to obtain a second workflow parameter for the second workflow, the plurality of workflow parameters comprising (i) a mapper to utilize during the map and reduce process, (ii) a reducer to utilize during the map and reduce process, (iii) an input location at which the plurality of data points are stored, (iv) an output location at which to store the processed data point, and (v) a location at which a job tracker which monitors a status of the first workflow resides.

7. The non-transitory computer-readable storage medium of claim 6 wherein the computer-executable instructions, when executed by the processor, cause the processor to perform steps further comprising: communicating, workflow status to the second workflow controller, wherein the workflow status comprises at least one of a succeeded status, a failed status, or a killed status.

8. The non-transitory computer-readable storage medium of claim 7 wherein the computer-executable instructions, when executed by the processor, cause the processor to perform steps further comprising: communicating.

9. The non-transitory computer-readable storage medium of claim 6 wherein the computer-executable instructions, when executed by the processor, cause the processor to perform steps further comprising: configuring the second workflow from the second workflow controller to execute one or more processes of an distributed file system.

10. The non-transitory computer-readable storage medium of claim 6 wherein the computer-executable instructions, when executed by the processor, cause the processor to perform steps further comprising: configuring the second workflow from the second workflow controller to execute one or more processes of a data warehouse.

11. A method of establishing compatibility between workflow controllers, comprising:
receiving a data stream, comprising a plurality of data points;
distributing individual data points of the data stream to one of a plurality of second computing devices, each second computing device being configured to process the data point received and generate a processed data point;
storing a first workflow having a first data format, the first workflow comprising a plurality of action nodes, each action node comprising an instruction to be executed wherein the instruction of at least one of the action nodes comprises a map and reduce process on a data point from the data stream;
scheduling, using a first workflow controller, execution of the action nodes of the first workflow;
executing one or more formatting processes on the first workflow in order to obtain a second workflow having a second data format that is compatible with a second workflow controller which schedules execution of the second workflow; and
wherein at least one of the formatting processes is configured to format a first workflow parameter of a plurality of first workflow parameters of the first workflow according to the second data format to obtain a second workflow parameter for the second workflow, the plurality of workflow parameters comprising (i) a mapper to utilize during the map and reduce process, (ii) a reducer to utilize during the map and reduce process, (iii) an input location at which the plurality of data points are stored, (iv) an output location at which to store the processed data point, and (v) a location at which a job tracker which monitors a status of the first workflow resides.

12. The method of claim 11, further comprising:

communicating a workflow status to the second workflow controller, wherein the workflow status comprises at least one of a succeeded status, a failed status, or a killed status.

13. The method of claim 12, further comprising:

communicating the workflow status to the second workflow controller before communicating the status to the first workflow controller.

14. The method of claim 11, further comprising:

configuring the second workflow from the second workflow controller to execute one or more processes of an distributed file system.

15. The method of claim 11, further comprising:

configuring the second workflow from the second workflow controller to execute one or more processes of a data warehouse.

* * * * *